United States Patent [19]

Burkel et al.

[11] Patent Number: 4,593,222

[45] Date of Patent: Jun. 3, 1986

[54] ELECTRIC CONTROL MOTOR

[75] Inventors: Rainer Burkel, Asperg; Bernd Taubitz, Schwieberdingen, both of Fed. Rep. of Germany

[73] Assignee: Robert Bosch GmbH, Stuttgart, Fed. Rep. of Germany

[21] Appl. No.: 660,996

[22] Filed: Oct. 15, 1984

[30] Foreign Application Priority Data

Oct. 15, 1983 [DE] Fed. Rep. of Germany ....... 3337590

[51] Int. Cl.[4] .............................................. H02K 1/12

[52] U.S. Cl. .................................... 310/254; 310/216; 310/190

[58] Field of Search ................ 310/216, 218, 190–193, 310/257, 254, 164, 266

[56] References Cited

U.S. PATENT DOCUMENTS 2,177,472 10/1939 Barrett ............................ 310/254 X
2,195,801 4/1940 Thibault .............................. 310/254
2,572,632 10/1951 Kurz .................................... 310/164
3,693,037 9/1972 West ............................... 310/190 X
3,953,750 4/1976 Hendershot, Jr. .............. 310/254 X
4,045,696 8/1977 Lutz et al. ....................... 310/266 X
4,051,401 9/1977 Hayward ......................... 310/257 X

*Primary Examiner*—Donovan F. Duggan
*Attorney, Agent, or Firm*—Edwin E. Greigg

[57] ABSTRACT

An electric control motor is proposed, which serves to adjust final control elements in closed- or open-loop control systems, in particular for varying the position of throttle devices provided for metering fuels in internal combustion engines. The control motor includes a housing, in which an electromagnetic coil and an armature are disposed, the armature being rotatably supported upon a shaft providing spaced air gaps therewith and with magnetic poles. The magnetic poles are disposed on arcuate conducting bodies, which are disposed in spaced relation on a nonmagnetic carrier body. At ends remote from the magnetic poles, the conducting bodies communicate with one another via a magnetically conductive plate.

6 Claims, 6 Drawing Figures

ELECTRIC CONTROL MOTOR

BACKGROUND OF THE INVENTION

The invention is directed to an electric control motor provided with an electromagnetic coil and an armature having air gaps between it and the magnetic poles. An electric control motor is already known in which the magnetic poles are disposed on a tubular carrier housing, and a plate is disposed on the other end of the tubular housing. An embodiment of this kind necessitates a relatively large expenditure in terms of machining and material.

OBJECT AND SUMMARY OF THE INVENTION

It is an object of the invention to provide an electric control motor having the advantage over the prior art of requiring less material and having a reduced weight, allowing for manufacturing expense.

It is another object of the invention and particularly advantageous for the pole pieces to be in the form of arcuate sections.

It is still another object of the invention for these pole pieces to be secured in recesses in a magnetically conductive plate and provided with a non-magnetic support disc.

It is yet another object of the invention and likewise advantageous to dispose the pole pieces in grooves upon a nonmagnetic, tubular carrier body, in particular one made of plastic.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
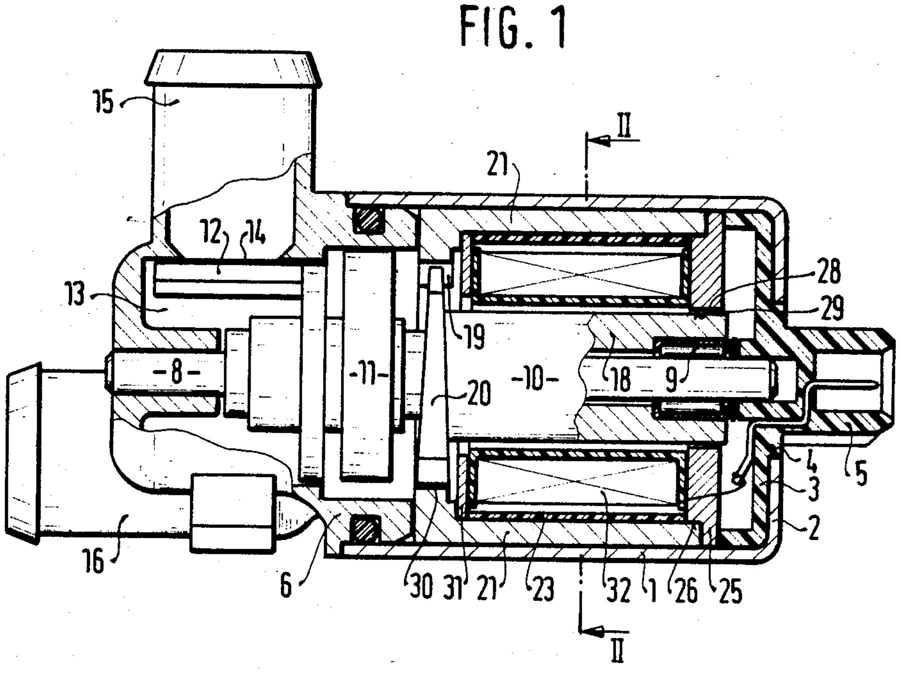
FIG. 1 is a section taken through an electric control motor embodied in accordance with the invention.

The electric control motor shown in FIG. 1 has a cup-shaped nonmagnetic housing 1, in which a bearing element 3 of plastic is disposed on the bottom 2, and a plug 5 disposed on said bearing element protrudes to the outside through an opening 4 in the bottom 2. A cap element 6 of nonmagnetic material closes the open end of the housing 1. A shaft 8 is pressed firmly into place in the bearing element 3 at one and and in the cap element 6 on the other. An armature 10 is rotatably supported on the shaft 8, for instance via roller bearings 9, counter to a spiral spring 11 serving as the restoring force. A throttle member 12 is connected with the armature 10, and embodied as a pipe section, by way of example. The throttle member 12 is pivotable about the shaft 8 in a pivoting chamber 13 of the cap element 6, thereby variably opening the cross section 14 of an inflow pipe 15 on the cap element 6. An outflow pipe 16 is likewise provided on the cap element 6, communicating with the pivoting chamber 13. The inflow pipe 15 may for instance communicate with a section of the intake tube upstream of a throttle valve of an internal combustion engine (not shown), and the outflow pipe 16 may communicate for instance with a section of the intake tube downstream of the throttle valve, so that a flow of air of varying size can be directed around the throttle valve of the engine by means of the throttle member 12, for instance, in order to regulate the idling rpm of the engine.

The armature 10 has a cylindrical section 18 and a wedge-shaped portion 20 oriented toward respective magnetic poles 19. In the present exemplary embodiment, two magnetic poles 19 are disposed facing one another, so that the armature 10 also has two wedge portions 20, each being associated with one of the magnetic poles 19. Each wedge portion 20 has a wedge-shaped longitudinal extent lying transverse to the shaft 8, such that in the operative direction of rotation of the armature 10 the surface area of the magnetic poles that is covered with each wedge portion 20 increases progressively as the rotation continues. Each magnetic pole 19 is provided, in accordance with the invention, on a bar-like magnetically conductive pole piece 21, which by way of example is provided with an arcuate cross section, and may be fabricated by extrusion. The magnetic pole 19 may be formed upon each pole piece 21 in any suitable known manner. According to the embodiment of FIGS. 1 and 2, each pole piece 21 is inserted into a respective groove 22 on the circumference of a nonmagnetic tubular carrier body 23 and is partially embraced and fixed in the axial direction by guide protrusions 24, for instance in the form of a dove-tailed guide. The carrier body 23 is advantageously sprayed plastic. Remote from the magnetic poles 19, the pole pieces 21 engage a magnetically-conducting plate 25, preferably at a collar 26. The magnetically-conducting plate 25 rests on the bearing element 3, against which it is pressed in the axial direction by the cap element 6 via the conducting bodies 21. A central bore 28 in the magnetically conducting plate 25 forms a first working air gap with the cylindrical section 18 of the armature 10 having a width of approximately 0.4 mm by way of example. A second working air gap 30, also 0.4 mm wide by way of example, is formed between each magnetic pole 19 and wedge section 20. To stabilize the second working air gap 30, a support disc 31 of nonmagnetic material is disposed in the interior of the carrier body 23, by means of which deformation of the carrier body 23 by radial forces is avoided. Between the plate 25 and the support disc 31, an electromagnetic coil 32 is disposed in the carrier body 23 and partially embraces the cylindrical section 18 of the armature 10; when electrically excited via the plug 5, the electromagnetic coil 32 generates a magnetic field by means of which the armature 10 is rotated counter to the force of the spiral spring 11.

Figure 2:
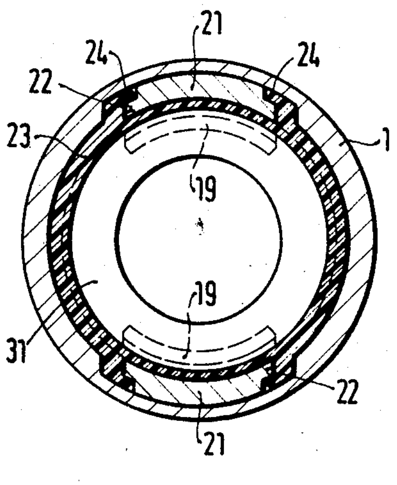
FIG. 2 is a section taken along the line II—II of FIG. 1.

In FIG. 2, the control motor is shown without the shaft 8, the armature 10 and the electromagnet coil 32, for the sake of clarity in the drawing. This simplification was also used in FIG. 3, which substantially shows a section through a control motor as in FIG. 2, but in which the pole pieces 21 are disposed in grooves 34 of the carrier body 23 which are open into the interior of the carrier body 23, so that guide protrusions 35 of the carrier body 23, from the inside, partially embrace the conducting bodies in the axial direction and fix them. In the exemplary embodiment of FIG. 2, the pole pieces 21, which rest with their outer surfaces on the housing 1, serve to center themselves and the carrier body 23, while in the exemplary embodiment of FIG. 3, the carrier body 23 abuts the inside of the housing 1 throughout and thus serves to align itself and the pole pieces 21 having the magnetic poles 19.

Figure 3:
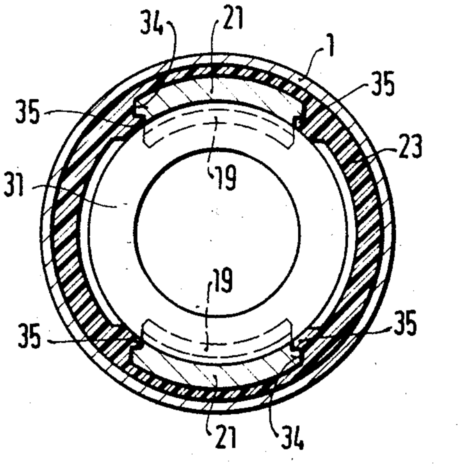
FIG. 3 shows a modified disposition within a carrier body of pole pieces embodied in accordance with the invention.

Following the invention in accordance with exemplary embodiments of FIGS. 1–3, magnetically conductive material is needed only for the magnetic poles 19, the pole pieces 21 and the plate 25, while the carrier body 23 can be fabricated of easily worked plastic, which is also light in weight.

Figure 4:
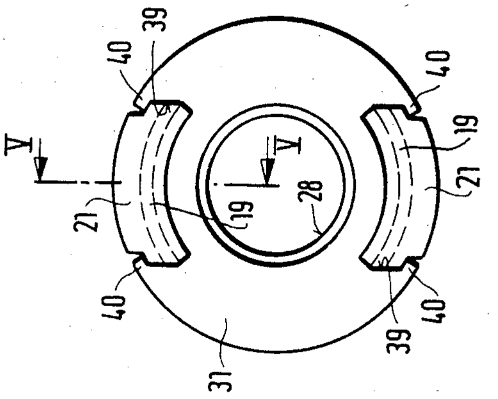
FIG. 4 shows a further disposition of pole pieces according to the invention on a magnetically conductive plate.
Figure 5:
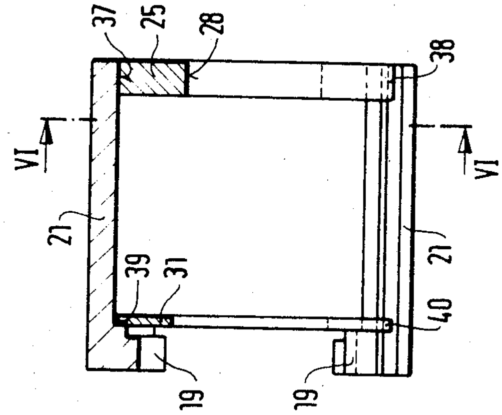
FIG. 5 is a section taken along the line V—V in FIG. 4.
Figure 6:
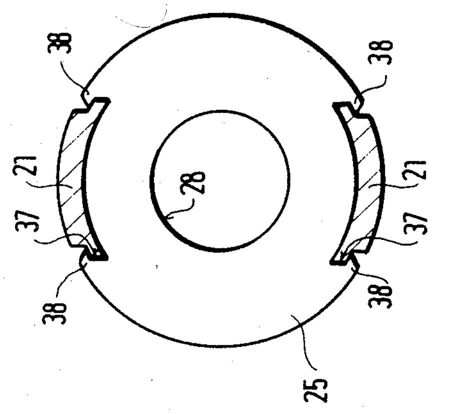
FIG. 6 is a section taken along the line VI—VI of FIG. 5.

In the further exemplary embodiment shown in FIGS. 4–6, the same reference numerals as in FIGS. 1–3 are used for elements remaining the same as and having the same function as those of FIGS. 1–3. A simplified illustration is used for FIGS. 4–6, in which now only specific individual elements are shown, namely, the conducting bodies with the magnetic poles, the plate, and the support disc. In contrast to the exemplary embodiments of FIGS. 1–3, no carrier body is provided in the exemplary embodiment of FIGS. 4–6; instead, the conducting bodies 21, embodied again with an arcuate cross section, protrude via ends remote from the magnetic poles 19 each into a complemental recess 37 of the plate 25. Radial fixation of the conducting bodies 21 is provided by guide protrusions 38 disposed on the plate 25 so as to partially embrace the conducting bodies. Near the magnetic poles 19, each conducting body 21 is disposed in a recess 39 provided in the support disc 31, the recess being formed with guide protrusions 40 partially embracing each pole pieces 21. Thus the pole pieces 21, which extend in the longitudinal direction, the support plate 31 disposed normally with respect to them, and the normally arranged magnetically conducting plate 25 fit together so as to comprise a firmly joined, unitary structure which can be achieved using relatively little material, meaning that it is thus not only easy to manufacture but also light in weight.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electric control motor comprising a housing provided with an electromagnetic coil and an armature, said armature being rotatably mounted upon a shaft in spaced relation with said shaft, said motor being provided with magnetic poles disposed upon pole pieces provided with an arcuate cross-section, each of said pole pieces being further provided with an associated magnetic pole, said pole pieces being further provided with extremities mounted in radially spaced relation, the extremity of each of said pole pieces remote from the magnetic poles being arranged to communicate via a magnetically conductive plate and further being arranged to protrude into a complemental recess provided in said plate so as to be retained therein, and the extremity of each of said pole pieces adjacent said pole is disposed in a recess provided in a non-magnetic support disc for retention therein.

2. An electric control motor comprising a housing provided with an electromagnetic coil and an armature, said armature being rotatably mounted upon a shaft in spaced relation with said shaft, said motor being provided with magnetic poles disposed upon pole pieces provided with an arcuate cross-section, each of said pole pieces further being disposed in a non-magnetic tubular carrier body, said pole pieces being provided with extremities mounted in radially spaced relation, the extremity of each of said pole pieces remote from the magnetic poles being arranged to communicate via a magnetically conductive plate and further being arranged to protrude into a complemental recess provided in said plate so as to be retained therein.

3. An electrical motor as defined by claim 2, further comprising the carrier body is fabricated of plastic.

4. An electric control motor as defined by claim 3, further comprising said pole pieces are oppositely disposed circumferentially of the carrier body.

5. An electric control motor as defined by claim 3, further comprising each pole piece is disposed against an interior wall portion of the carrier body.

6. An electric control motor as defined by claim 3, further comprising a support disc is provided in abutment with the pole pieces near the magnetic poles.

* * * * *